United States Patent
Shigeta (10) Patent No.: US 10,498,997 B2
(45) Date of Patent: Dec. 3, 2019

(54) IMAGE SENSING APPARATUS AND DRIVING METHOD THEREOF

(71) Applicant: CANON KABUSHIKI KAISHA, Tokyo (JP)

(72) Inventor: Kazuyuki Shigeta, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 573 days.

(21) Appl. No.: 14/554,416

(22) Filed: Nov. 26, 2014

(65) Prior Publication Data

US 2015/0163421 A1  Jun. 11, 2015

(30) Foreign Application Priority Data

Dec. 6, 2013  (JP) .................. 2013-253610

(51) Int. Cl.
| | |
|---|---|
| *H04N 5/33* | (2006.01) |
| *H04N 5/378* | (2011.01) |
| *H04N 5/353* | (2011.01) |
| *H04N 5/361* | (2011.01) |

(52) U.S. Cl.
CPC .............. *H04N 5/378* (2013.01); *H04N 5/33* (2013.01); *H04N 5/3532* (2013.01); *H04N 5/361* (2013.01)

(58) Field of Classification Search
CPC .......... G01J 1/18; G01J 5/0806; H04N 5/361; H04N 5/3745; H04N 5/2351; H04N 5/3591; H04N 5/3658; H04N 5/378; H04N 1/23; H04N 1/4072
USPC ...................................................... 348/164
See application file for complete search history.

(56) References Cited

U.S. PATENT DOCUMENTS

| | | | |
|---|---|---|---|
| 7,859,575 B2 | 12/2010 | Ota et al. | |
| 8,189,086 B2 | 5/2012 | Hashimoto et al. | |
| 8,310,576 B2 | 11/2012 | Hashimoto et al. | |
| 8,319,305 B2 | 11/2012 | Nagata | |
| 8,390,710 B2 | 3/2013 | Shigeta et al. | |
| 8,553,119 B2 | 10/2013 | Hashimoto et al. | |
| 8,624,992 B2 | 1/2014 | Ota et al. | |
| 8,653,617 B2 | 2/2014 | Nagata | |
| 8,836,832 B2 | 9/2014 | Shigeta et al. | |
| 8,928,789 B2 | 1/2015 | Hashimoto et al. | |
| 2004/0012700 A1* | 1/2004 | Okisu | H04N 1/4072 348/333.01 |
| 2009/0152664 A1* | 6/2009 | Klem | H01L 27/14603 257/440 |

(Continued)

FOREIGN PATENT DOCUMENTS

| | | |
|---|---|---|
| JP | 2010-267680 A | 11/2010 |
| JP | 2012-050024 A | 3/2012 |
| JP | 2012050024 A * | 3/2012 |

*Primary Examiner* — Masum Billah
(74) *Attorney, Agent, or Firm* — Venable LLP (57) ABSTRACT

An image sensing apparatus senses an image of an object illuminated with illumination light including an infrared ray. the apparatus includes an effective pixel region including an effective pixel configured to detect an infrared ray returning from the object, a black reference pixel region including a black reference pixel configured to obtain a black reference signal, and a control unit configured to control the black reference pixel such that charge accumulation in the black reference pixel for obtaining the black reference signal is performed in a period during which the object is not illuminated with the illumination light.

15 Claims, 12 Drawing Sheets

(56) References Cited

U.S. PATENT DOCUMENTS

| | | | |
|---|---|---|---|
| 2009/0180014 A1* | 7/2009 | Noda | H04N 5/3452 |
| | | | 348/308 |
| 2010/0157083 A1 | 6/2010 | Ohya et al. | |
| 2013/0020463 A1* | 1/2013 | Lee | H04N 5/357 |
| | | | 250/206 |
| 2013/0050552 A1* | 2/2013 | Oishi | H01L 27/14603 |
| | | | 348/301 |
| 2013/0228673 A1 | 9/2013 | Hashimoto et al. | |
| 2013/0271633 A1 | 10/2013 | Hashimoto et al. | |
| 2014/0253752 A1 | 9/2014 | Kawano et al. | |

* cited by examiner

IMAGE SENSING APPARATUS AND DRIVING METHOD THEREOF

BACKGROUND OF THE INVENTION

Field of the Invention

The present invention relates to an image sensing apparatus and a driving method thereof.

Description of the Related Art

Images of infrared rays, particularly, near-infrared rays are used for industrial use, medical use, and the like. The near-infrared ray is an electromagnetic wave having a wavelength of about 700 to 2,500 nm. A typical example of an application of near-infrared rays is near-infrared spectroscopy. The near-infrared spectroscopy is a measurement method of irradiating a measurement target with near-infrared rays, and calculating a component based on a change of the degree at which infrared light is absorbed. The near-infrared spectroscopy is capable of non-destructive, non-contact measurement in real time. The near-infrared spectroscopy is used in a wide range of fields including analysis and inspection of food ingredients and agricultural products, composition analysis of a celestial body, process control of pharmaceuticals, and medical applications.

It is known that, among near-infrared rays, near-infrared rays of 800 to 1,000 nm have good body transmission. A technique of visualizing the inside of a body by using near-infrared rays has been used for experiments and studies in the fields of medicine, biology, and the like. Examples of an application of the above-mentioned near-infrared spectroscopy are applications to measurement of the blood stream of a cerebral cortex, and a pulse oximeter which detects the pulsation of the blood vessel of a finger or the like. There is also proposed a technique in which a drug excited by near-infrared rays to emit near-infrared fluorescence is caused to reach the inside of a body through a blood vessel or the like and the fluorescence from the surface of the body is observed to visualize the inside of the body.

In a solid-state image sensor such as a CCD sensor or CMOS sensor, an infrared ray can enter even a pixel shielded from light in order to obtain a black reference signal, that is, a black reference pixel (optical black pixel) upon reflection within the substrate because the infrared ray is longer in wavelength than visible light. If the near-infrared ray enters the black reference pixel, the black reference signal for detecting the near-infrared ray in the black reference pixel varies. As a result, even an effective pixel signal corrected based on the black reference signal contains an error.

Japanese Patent Laid-Open No. 2010-267680 has described the light shielding structure of an improved optical black (OP) portion. This light shielding structure includes a light shielding film interposed between an on-chip lens and one surface of a semiconductor substrate on which a sensor is formed, and a light shielding film arranged on the other surface of the semiconductor substrate. Japanese Patent Laid-Open No. 2012-50024 has described a method in which, when an IR cut filter is removed, an OB clamp region is set at a position more apart from an effective pixel portion than in a normal state.

However, the techniques described in Japanese Patent Laid-Open Nos. 2010-267680 and 2012-50024 have an effect of reducing the influence of infrared rays on a black reference signal, but cannot completely remove the influence.

SUMMARY OF THE INVENTION

The present invention provides a technique advantageous for more effectively reducing the influence of infrared rays on a black reference signal.

One of the features of the present invention provides an image sensing apparatus for sensing an image of an object illuminated with illumination light including an infrared ray, the apparatus comprising: an effective pixel region including an effective pixel configured to detect an infrared ray returning from the object; a black reference pixel region including a black reference pixel configured to obtain a black reference signal; and a control unit configured to control the black reference pixel such that charge accumulation in the black reference pixel for obtaining the black reference signal is performed in a period during which the object is not illuminated with the illumination light.

Further features of the present invention will become apparent from the following description of exemplary embodiments with reference to the attached drawings.

DESCRIPTION OF THE EMBODIMENTS

The present invention will now be described through exemplary embodiments with reference to the accompanying drawings.

Figure 7:
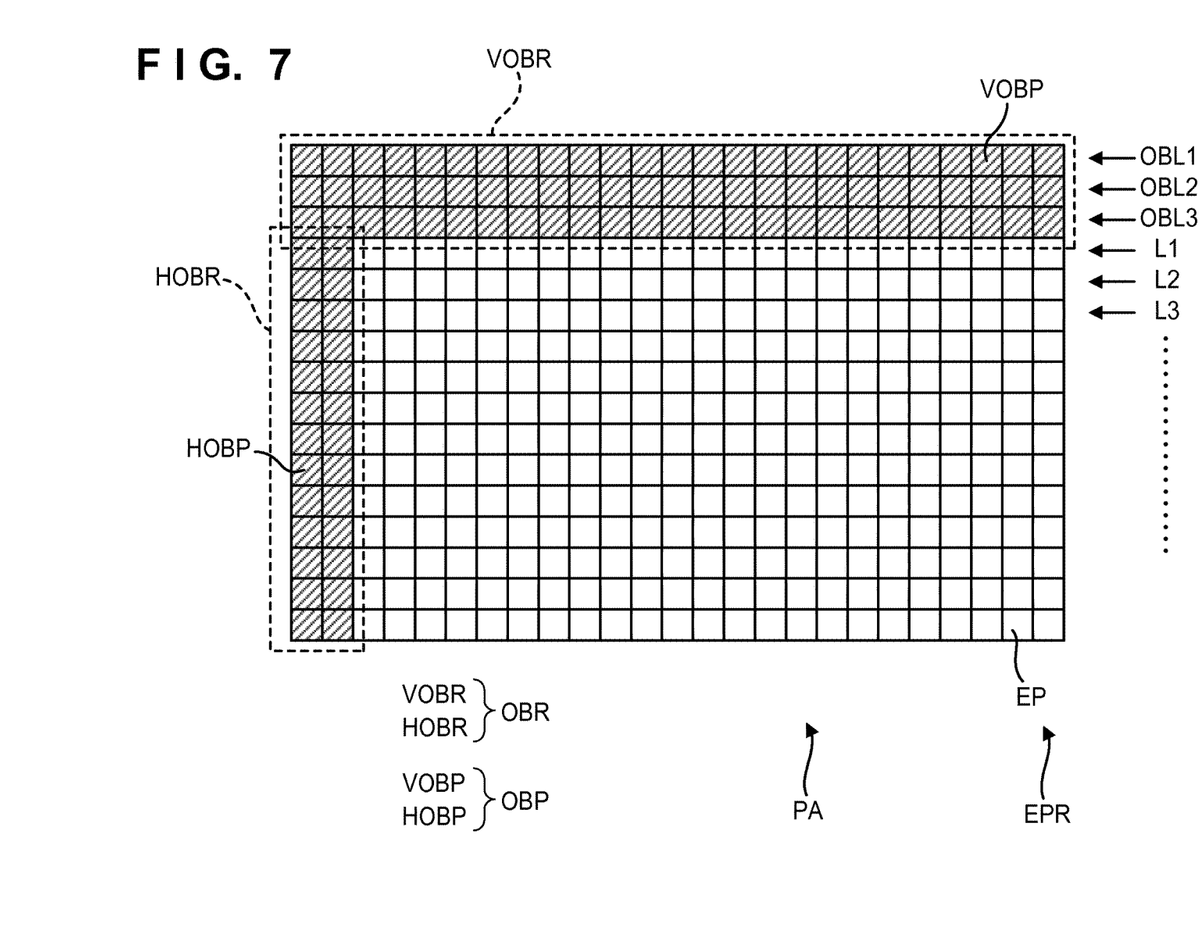
FIG. 7 is a view exemplifying the pixel array of the image sensor.

FIG. 7 exemplarily, schematically shows a pixel array PA of an image sensor. Quadrangles arrayed in a matrix represent pixels. Hatched pixels are black reference pixels (optical black pixels) OBP. The black reference pixels OBP are pixels shielded from light by a light shielding member arranged on the light incident surface side of a substrate on which the pixel array PA is arranged. However, in the black reference pixels OBP, infrared light may enter the photoelectric converters of the black reference pixels OBP. Pixels not hatched are effective pixels EP. The effective pixels EP are pixels for detecting an optical image. Light which forms an optical image enters the effective pixels EP.

The black reference pixels OBP include vertical black reference pixels VOBP arranged in a vertical black reference pixel region VOBR, and horizontal black reference pixels HOBP arranged in a horizontal black reference pixel region HOBR. The vertical black reference pixel region VOBR is a region adjacent in the vertical direction (column direction) to an effective pixel region EPR for detecting an optical image. The vertical black reference pixel region VOBR is a region constituted by rows including only the vertical black reference pixels VOBP. The horizontal black reference pixel region HOBR is a region adjacent in the horizontal direction to the effective pixel region EPR for detecting an optical image. The effective pixel region EPR is a region in which the effective pixels EP are arrayed.

The vertical black reference pixel region VOBR or a black reference pixel region OBR includes a plurality of black reference pixel rows OBL1, OBL2, and OBL3. The effective pixel region EPR includes a plurality of effective pixel rows L1, L2, L3, . . . . In this specification, the effective pixel rows L1, L2, and L3 are described to include the horizontal black reference pixels HOBP in addition to the effective pixels EP. The vertical black reference pixels VOBP are arranged on rows different from the effective pixel rows L1, L2, and L3 included in the effective pixel region EPR.

Figure 3:
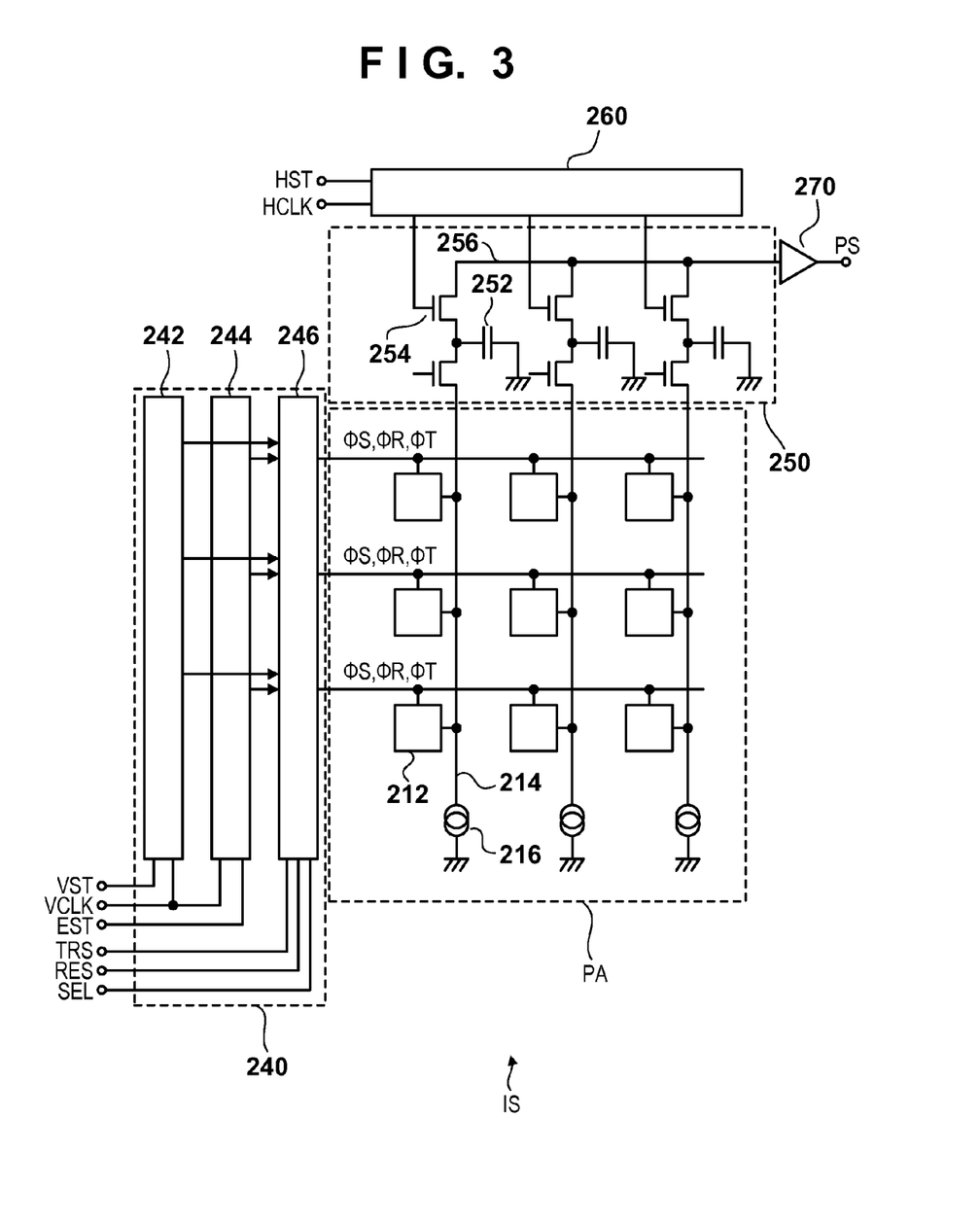
FIG. 3 is a diagram exemplifying the arrangement of an image sensor.

FIG. 3 exemplifies the arrangement of an image sensor IS. The image sensor IS has the above-described pixel array PA. In FIG. 3, the pixel array PA is constituted by nine pixels 212 which are arrayed to form three rows×three columns. In practice, a larger number of pixels 212 are arrayed to form larger numbers of rows and columns. As described above, the pixel array PA includes the effective pixel region EPR and black reference pixel region OBR.

The image sensor IS includes a row selection unit 240, readout unit 250, column selection unit 260, and output unit 270 in addition to the pixel array PA. The row selection unit 240 selects a row in the pixel array PA. The selection of a row is an operation for outputting signals of pixels belonging to this row to corresponding column signal lines 214. The row selection unit 240 resets pixels of a selected row, starts a charge accumulation operation, and outputs a signal corresponding to accumulated charges to the column signal line 214.

The row selection unit 240 includes, for example, a first shift register 242 for readout and a second shift register 244 for an electronic shutter. The row selection unit 240 also includes a selector 246 for selecting one of a signal from the first shift register 242 and a signal from the second shift register 244, and supplying the signal to the pixel array PA. The first shift register 242 operates in accordance with a start pulse VST and transfer clock VCLK which are supplied from a control unit 130 (to be described later). The second shift register 244 operates in accordance with a start pulse EST and the transfer clock VCLK which are supplied from the control unit 130. The selector 246 selects one of a signal from the first shift register 242 and a signal from the second shift register 244 in accordance with a selection signal SEL supplied from the control unit 130.

The pixels 212 arranged on the same column are connected to the common column signal line 214. The respective column signal lines 214 are connected to holding capacitors 252 for holding a signal output from the pixel 212. The holding capacitors 252 are connected to a horizontal signal line 256 via horizontal transfer switches 254. The horizontal transfer switches 254 are controlled by a column selection signal from the column selection unit 260. The column selection unit 260 can be constituted as, for example, a horizontal scanning circuit which is controlled by a start pulse HST and transfer clock HCLK which are supplied from the control unit 130. The horizontal signal line 256 is connected to the output unit 270. When the horizontal transfer switch 254 is turned on, a signal held in the holding capacitor 252 is supplied to the output unit 270 via the horizontal signal line 256. This signal is amplified by the output unit 270 and output as a pixel signal from an output terminal PS.

Figure 4:
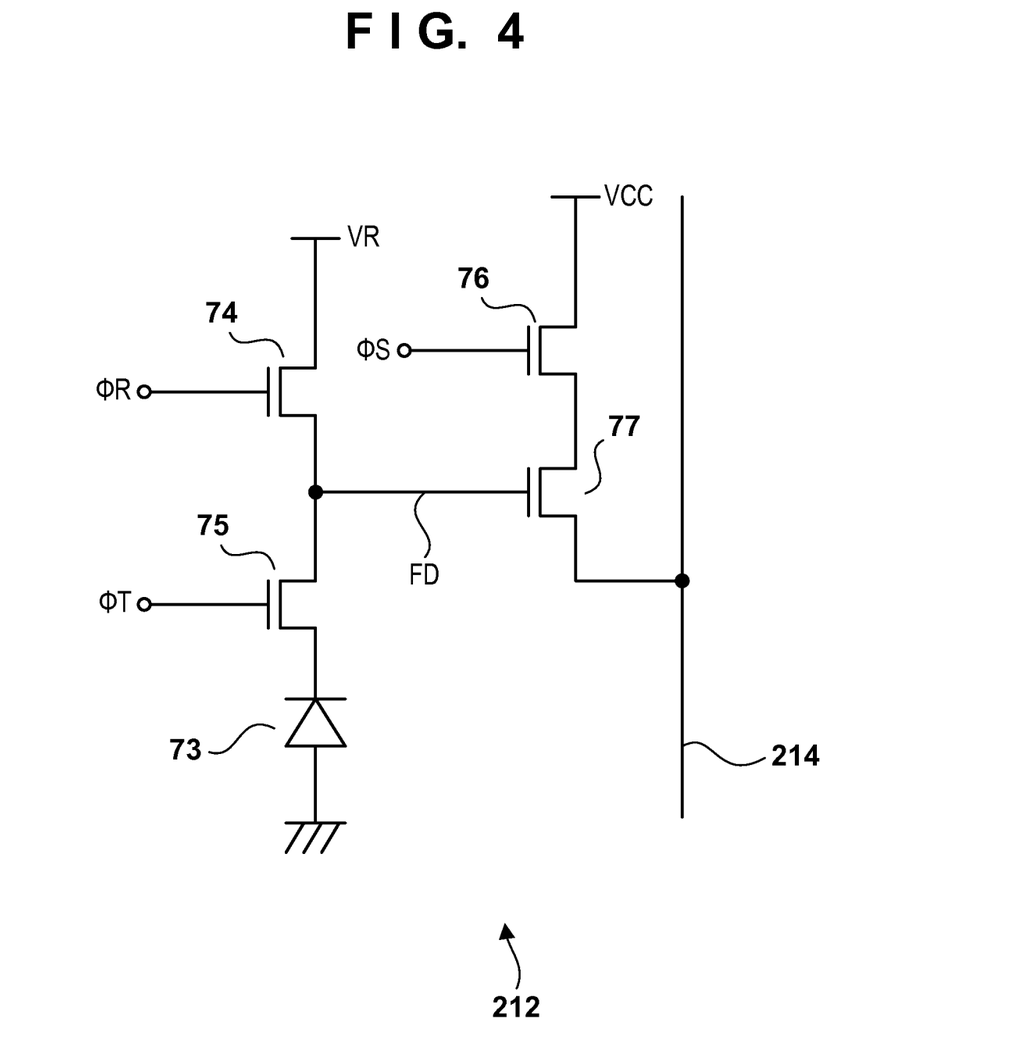
FIG. 4 is a circuit diagram exemplifying the arrangement of a pixel.

FIG. 4 shows an example of the arrangement of the pixel 212. The pixel 212 can include a photoelectric converter 73, transfer transistor 75, amplification transistor 77, reset transistor 74, and selection transistor 76. The photoelectric converter 73 can include, for example, a photodiode having an anode grounded and a cathode connected to the drain terminal of the transfer transistor 75. The source of the transfer transistor 75, the source of the reset transistor, and the gate of the amplification transistor 77 constitute a charge-voltage converter FD which converts charges into a voltage. The charge-voltage converter FD includes a floating diffusion. The drain of the reset transistor 74 is connected to a power supply VR. The drain of the selection transistor 76 is connected to a power supply VCC. The drain of the amplification transistor 77 is connected to the power supply VCC via the selection transistor 76, and the source of the amplification transistor 77 is connected to the column signal line 214.

When the transfer transistor 75 is turned on by activating a transfer signal ΦT by the row selection unit 240, charges accumulated in the photoelectric converter 73 are transferred to the charge-voltage converter FD. When the reset transistor 74 is turned on by activating a reset signal ΦR by the row selection unit 240, the voltage of the charge-voltage converter FD is reset to a voltage corresponding to the power supply VR. Further, when the transfer signal ΦT and reset signal ΦR are simultaneously activated, the photoelectric converter 73 is also reset to a voltage corresponding to the voltage of the power supply VR. The operation of resetting the photoelectric converter 73 is also understood as an operation of resetting the pixel 212. When the selection transistor 76 is turned on by activating a selection signal ΦS by the row selection unit 240, the amplification transistor 77 and a current source 216 form a source follower circuit. The source follower circuit outputs a signal corresponding to the gate voltage of the amplification transistor 77 to the column signal line 214.

The operation of the image sensor IS in FIGS. 3 and 4 will be explained with reference to FIGS. 5 and 6. VST, VCLK, HST, and HCLK correspond to VST, VCLK, HST, and HCLK in FIGS. 3 and 4. ΦR1, ΦR2, ΦRn, and ΦRn+1 are reset signals ΦR supplied to the pixels 212 on the first row, second row, nth row, and (n+1)th row, respectively. ΦT1, ΦT2, ΦTn, and ΦTn+1 are transfer signals ΦT supplied to the pixels 212 on the first row, second row, nth row, and (n+1)th row, respectively. Here, the first and second rows are black reference pixel rows, and the nth and (n+1)th rows are effective pixel rows.

Figure 5:
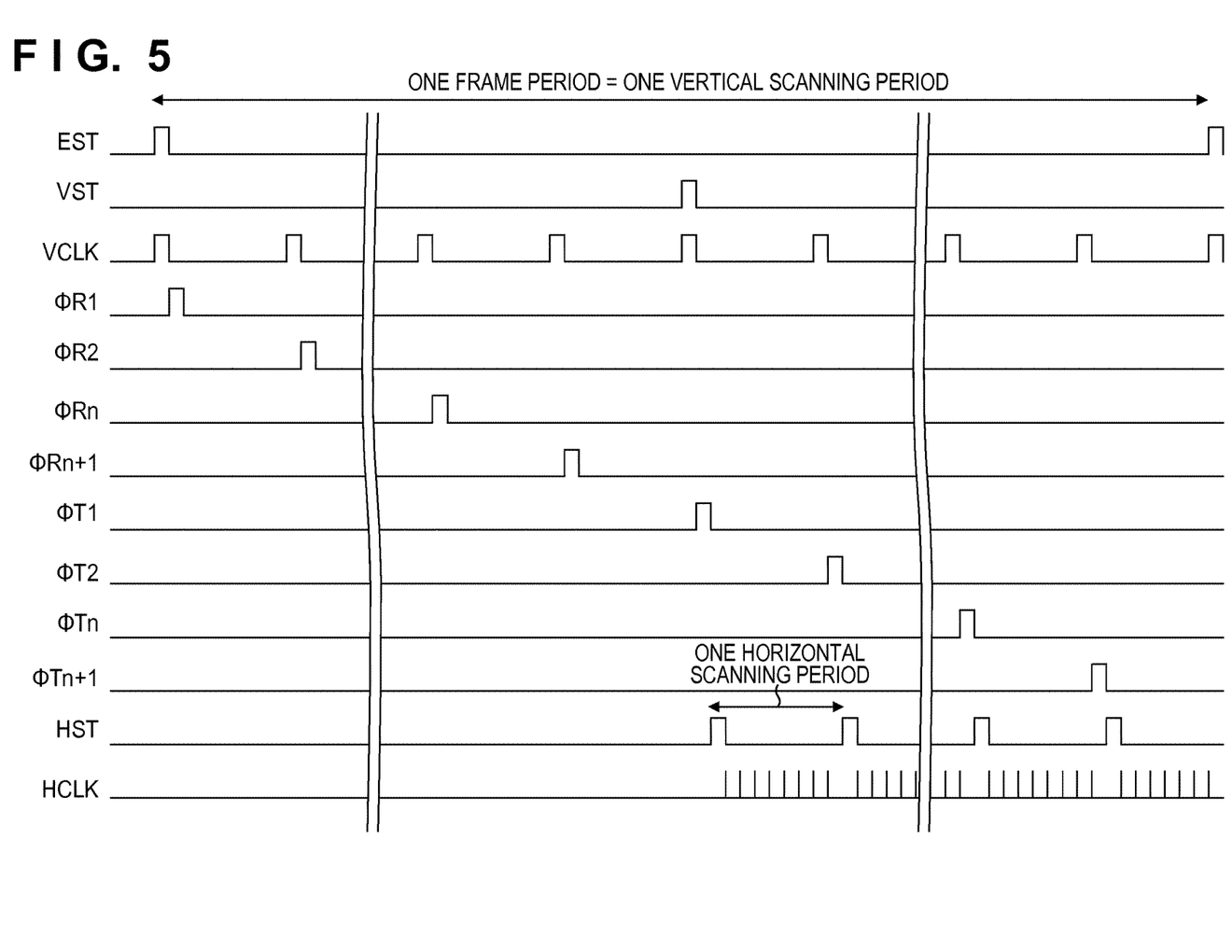
FIG. 5 is a chart exemplifying the operation of the image sensor.

In FIG. 5, a period from EST (or VST) to EST (or VST) of the next frame is the period of one frame, that is, one frame period=one vertical scanning period. A row to be selected by the second shift register 244 starts from the first row in response to activation of EST, and moves sequentially from top to bottom in synchronism with VCLK. In accordance with this, ΦR1, ΦR2, ..., ΦRn, and ΦRn+1 are activated sequentially.

In contrast, a row to be selected by the first shift register 242 starts from the first row in response to activation of VST, and moves sequentially from top to bottom in synchronism with VCLK. In accordance with this, ΦT1, ΦT2, ..., ΦTn, and ΦTn+1 are activated sequentially. Then, charges in the photoelectric converter 73 are transferred to the charge-voltage converter FD. A signal corresponding to the charges transferred to the charge-voltage converter FD is output to the column signal line 214, and written in the holding capacitor 252. After that, the column selection unit 260 starts scanning in the horizontal direction in response to activation of HST. In response to this, the holding capacitors 252 of a plurality of columns are sequentially selected in synchronism with HCLK, and signals held in the selected holding capacitors 252 are output from the output terminal PS via the horizontal signal line 256 and output unit 270.

Figure 6:
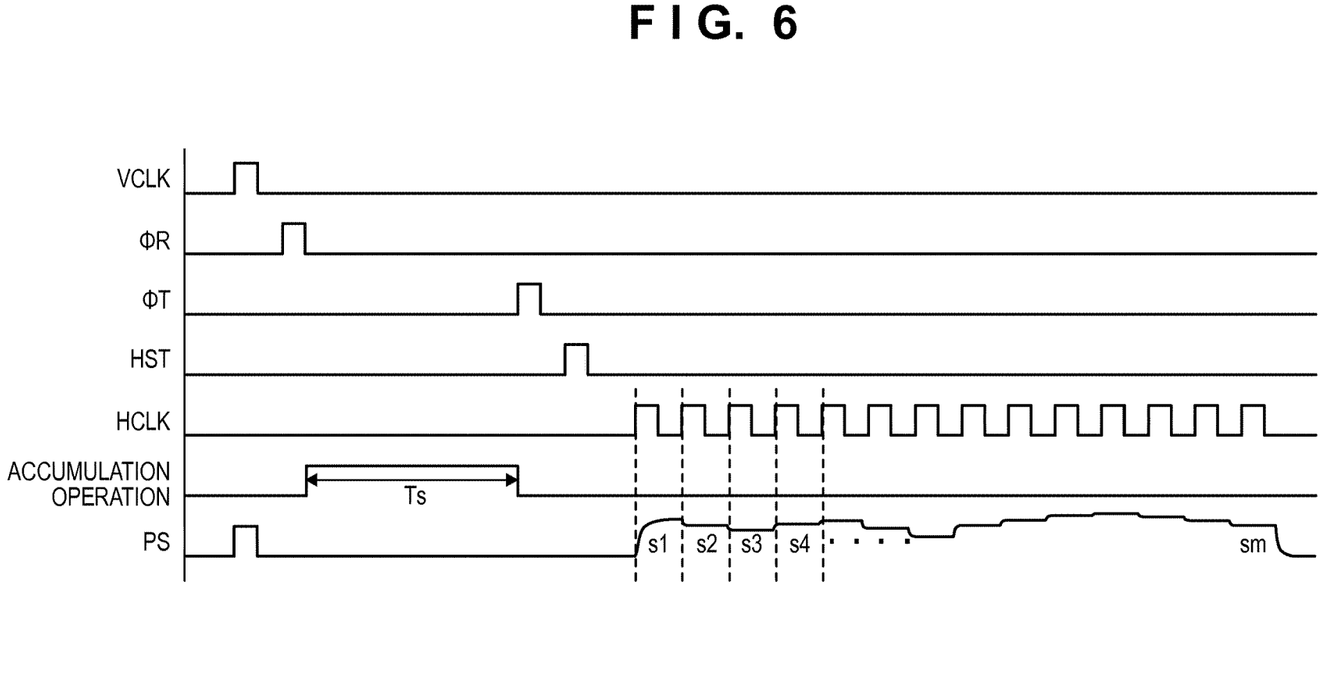
FIG. 6 is a chart exemplifying the operation of the image sensor.

FIG. 6 is an enlarged view showing one horizontal scanning period in FIG. 5. A period from a timing when ΦRn is inactivated after activation to a timing when ΦTn is activated is an accumulation period Ts in the pixel. The accumulation period Ts shifts between rows because the timings to activate the reset signal ΦR and transfer signal ΦT differ between rows, as shown in FIG. 5. In FIG. 6, pixel signals output from the output terminal PS are represented as s1, s2, ..., sm. The image sensor IS outputs pixel signals of the first to final rows in this fashion. Some of these pixel signals are black reference signals from the black reference pixels.

Figure 1:
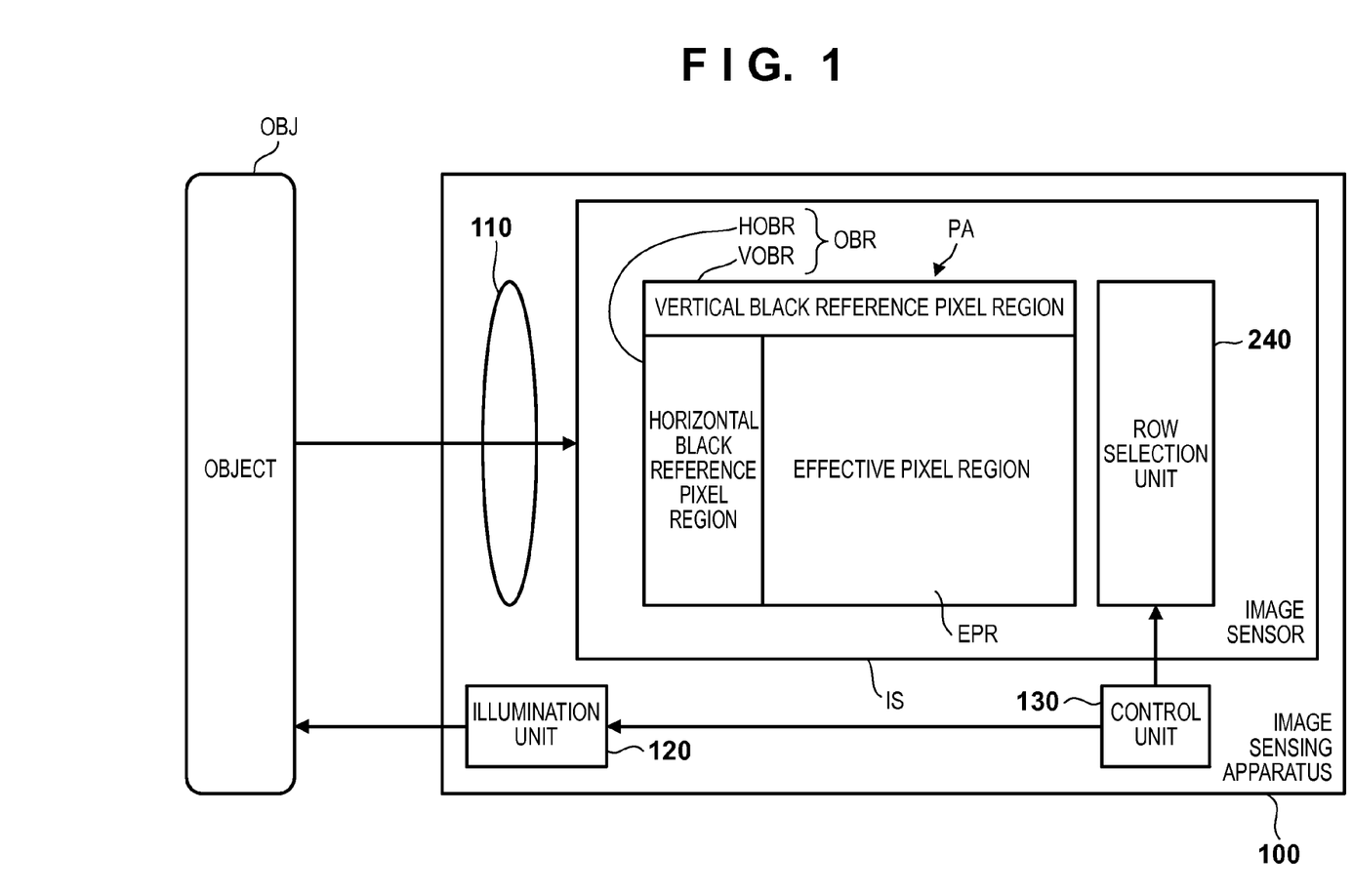
FIG. 1 is a block diagram showing the arrangement of an image sensing apparatus according to the first embodiment.

FIG. 1 is a block diagram showing the arrangement of an image sensing apparatus 100 according to the first embodiment of the present invention. The image sensing apparatus 100 is defined as an apparatus including at least an image sensor IS. When the image sensing apparatus 100 includes only the image sensor IS, the image sensing apparatus 100 and image sensor IS are apparatuses equivalent to each other. In this case, the image sensing apparatus 100 can be understood as an image sensor such as a MOS image sensor or CCD image sensor. When the image sensing apparatus 100 includes the image sensor IS, and an optical system 110 which forms an optical image on the image sensor IS, the image sensing apparatus 100 can be understood as a camera or an apparatus having the camera function. The image sensor IS can have the arrangement described with reference to FIGS. 3 and 4. In FIG. 1, the arrangement of part of the image sensor IS is not illustrated for descriptive convenience.

The image sensing apparatus 100 or image sensor IS can include a pixel array PA and row selection unit 240. The pixel array PA includes an effective pixel region EPR and black reference pixel region OBR, as described with reference to FIG. 7. The black reference pixel region OBR can include a vertical black reference pixel region VOBR and horizontal black reference pixel region HOBR. The black reference pixel region OBR includes black reference pixels OBP. The black reference pixels OBP can include vertical black reference pixels VOBP and horizontal black reference pixels HOBP.

The image sensing apparatus 100 includes a control unit 130. The control unit 130 may be integrated in the image sensor IS or arranged outside the image sensor IS. The image sensing apparatus 100 includes the optical system 110 which forms an optical image in the effective pixel region EPR of the pixel array PA of the image sensor IS. The optical system 110 may be interchangeable. The image sensing apparatus 100 can include an illumination unit 120. The illumination unit 120 illuminates an object OBJ with illumination light including an infrared ray. The infrared ray can be, for example, a near-infrared ray.

The image sensing apparatus 100 is configured to sense an image of the object OBJ illuminated with illumination light including an infrared ray by the illumination unit 120. The image sensing apparatus 100 or image sensor IS is understood as an apparatus having the effective pixel region EPR including effective pixels EP which detect an infrared ray returning from the object OBJ illuminated by the illumination unit 120. The image sensing apparatus 100 or image sensor IS can be understood as an apparatus having the black reference pixel region OBR (more specifically, the vertical black reference pixel region VOBR) including black reference pixels OBP (more specifically, the vertical black reference pixels VOBP) for obtaining a black reference signal.

The control unit 130 controls the black reference pixels OBP (more specifically, the vertical black reference pixels VOBP) so that charge accumulation for obtaining a black reference signal in the black reference pixel OBP (more specifically, the vertical black reference pixel VOBP) is performed in a period in which the object is not illuminated with illumination light.

Figure 2:
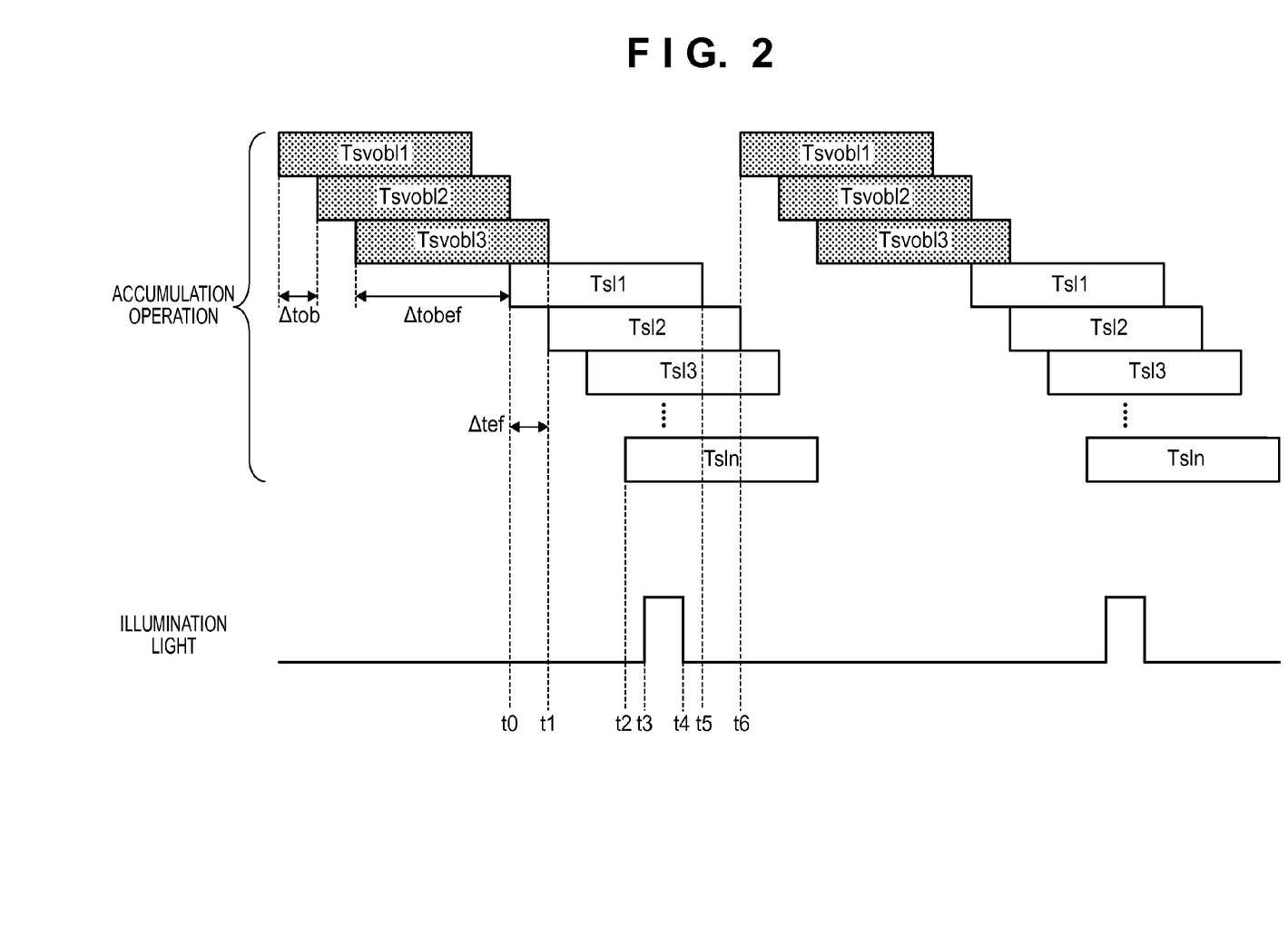
FIG. 2 is a chart showing a control example (driving example) of a vertical black reference pixel, effective pixel, and illumination unit in the image sensing apparatus according to the first embodiment.

FIG. 2 shows a control example (driving example) of the vertical black reference pixel VOBP, effective pixel EP, and illumination unit 120. Tsvob11, Tsvob12, and Tsvob13 indicate accumulation operations on black reference pixel rows OBL1, OBL2, and OBL3. Tsl1, Tsl2, Tsl3, ..., Tsln indicate accumulation operations on effective pixel rows L1, L2, L3, ..., Ln. The accumulation operation start timing has a time difference Δtob between adjacent black reference pixel rows out of the black reference pixel rows OBL1, OBL2, and OBL3. Also, the accumulation operation end timing has a time difference Δtob between adjacent black reference pixel rows out of the black reference pixel rows OBL1, OBL2, and OBL3. The accumulation operation start timing has a time difference Δtef between adjacent effective pixel rows out of the effective pixel rows L1, L2, L3, ..., Ln. In addition, the accumulation operation end timing has a time difference Δtef between adjacent effective pixel rows out of the effective pixel rows L1, L2, L3, ..., Ln. Δtob and Δtef may be equal to or different from each other.

The row selection unit 240 which operates under the control of the control unit 130 controls the accumulation operation on the black reference pixel rows OBL1, OBL2, and OBL3 and the effective pixel rows L1, L2, L3, ..., Ln, that is, the accumulation operation in the pixel array PA. The control unit 130 controls the illumination unit 120 to generate illumination light in the period between timing t3 and timing t4.

Timing t0 is the start timing of the accumulation operation on the first effective pixel row L1 (effective pixel row adjacent to the vertical black reference pixel region VOBR) out of the effective pixel rows L1, L2, L3, ..., Ln. Timing t1 is the end timing of the accumulation operation on the final black reference pixel row OBL3 (black reference pixel row adjacent to the effective pixel region EPR) out of the black reference pixel rows OBL1, OBL2, and OBL3. Timing t2 is the start timing of the accumulation operation on the final effective pixel row Ln out of the effective pixel rows L1, L2, L3, ..., Ln. Timing t5 is the end timing of the accumulation operation on the first effective pixel row L1 out of the effective pixel rows L1, L2, L3, . . . , Ln. Timing t6 is the start timing of the accumulation operation on the first black reference pixel row OBL1 out of the black reference pixel rows OBL1, OBL2, and OBL3.

t3 is later than t1 and t2, and t4 is earlier than t5 and t6. That is, the control unit 130 controls the vertical black reference pixels VOBP so that charge accumulation for obtaining a black reference signal in the vertical black reference pixel VOBP is performed in periods during which the object is not illuminated with illumination light from the illumination unit 120 (a period before t3 and a period after t4). In other words, the control unit 130 controls the vertical black reference pixels VOBP and illumination unit 120 so that the first period during which charge accumulation in the vertical black reference pixel VOBP for obtaining a black reference signal is performed, and the second period during which the illumination unit 120 generates illumination light do not include an overlapping period. This prevents entrance of infrared light into the photoelectric converter of the vertical black reference pixel VOBP in the period during which charge accumulation in the vertical black reference pixel VOBP for obtaining a black reference signal is performed. An accurate black reference signal can therefore be obtained.

A difference Δtobef between the start timing of charge accumulation for obtaining a black reference signal on the black reference pixel row OBL3, and t0 (the start timing of charge accumulation on the effective pixel row L1 adjacent to the vertical black reference pixel region VOBR out of a plurality of effective pixel rows) is preferably larger than the difference Δtob between start timings of charge accumulation for obtaining black reference signals on two adjacent black reference pixel rows. Alternatively, the difference Δtobef between t0 and t1 is preferably larger than the difference Δtef between start timings of charge accumulation on two adjacent effective pixel rows. This is effective for setting a time interval between the generation period (between t3 and t4) of illumination light by the illumination unit 120, and the accumulation period for obtaining a black reference signal in the vertical black reference pixel VOBP.

The accumulation period for obtaining black reference signals on the black reference pixel rows OBL1, OBL2, and OBL3 may be shorter than the accumulation period on the effective pixel rows L1, L2, L3, . . . , Ln. In this case, the frame rate can be increased.

Figure 8:
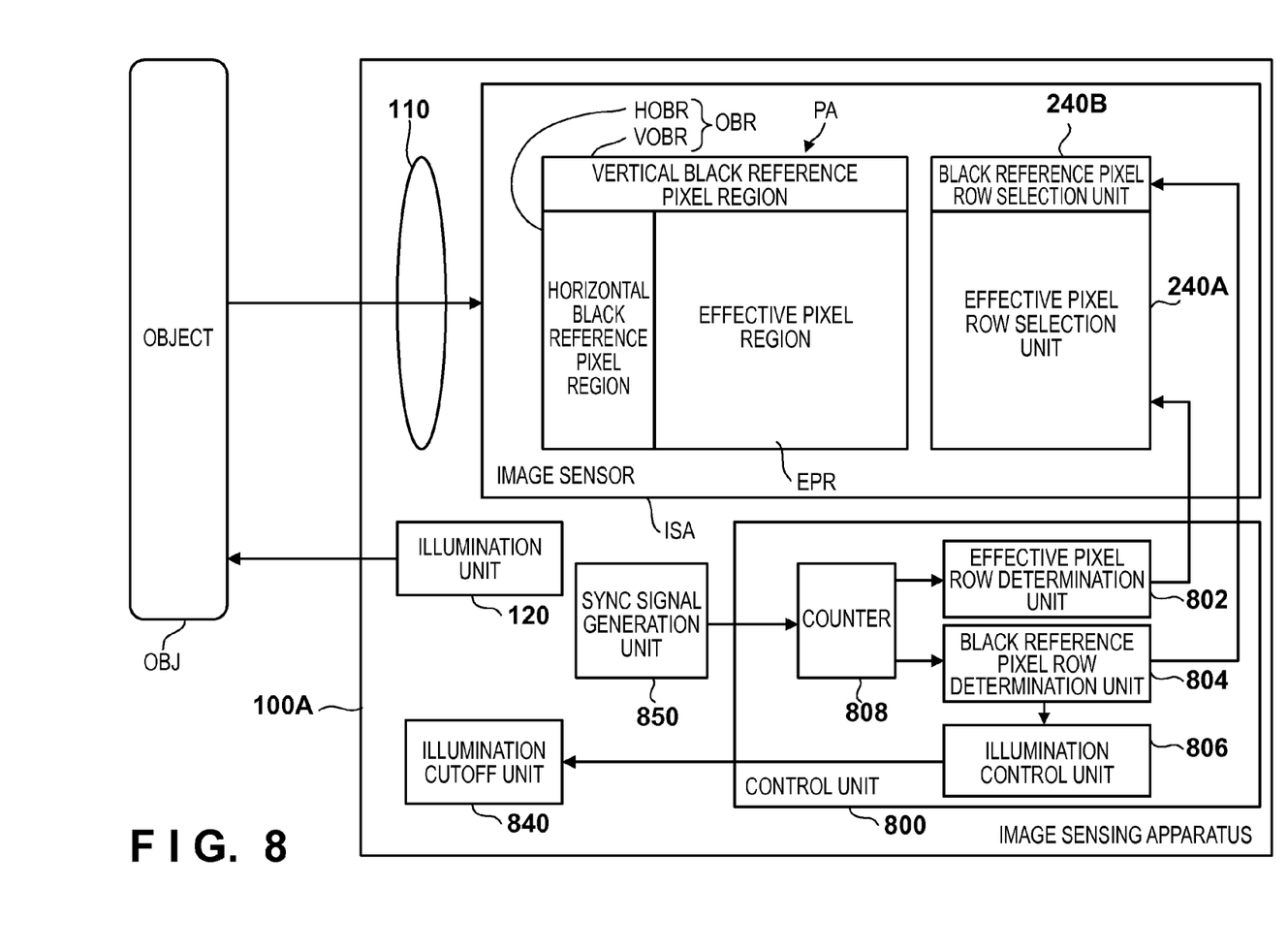
FIG. 8 is a block diagram showing the arrangement of an image sensing apparatus according to the second embodiment.

FIG. 8 is a block diagram showing the arrangement of an image sensing apparatus 100A according to the second embodiment of the present invention. The image sensing apparatus 100A according to the second embodiment includes at least an image sensor ISA. The image sensor ISA includes a pixel array PA, an effective pixel row selection unit 240A which selects an effective pixel row, and a black reference pixel row selection unit 240B which selects a black reference pixel row.

The image sensing apparatus 100A includes a control unit 800. The control unit 800 may be integrated in the image sensor ISA or arranged outside the image sensor ISA. The control unit 800 includes a counter 808, effective pixel row determination unit 802, black reference pixel row determination unit 804, and illumination control unit 806.

The image sensing apparatus 100A also includes an illumination unit 120, illumination cutoff unit 840, and sync signal generation unit 850. The illumination unit 120 does not receive a control signal synchronized with the accumulation operation in the image sensor ISA. The illumination cutoff unit 840 which operates under the control of the illumination control unit 806 controls illumination of an object OBJ with illumination light generated by the illumination unit 120. The illumination cutoff unit 840 cuts off illumination of the object OBJ by the illumination unit 120 in accordance with an instruction from the illumination control unit 806. The illumination cutoff unit 840 may be a mechanical mechanism (for example, a shutter mechanism) which cuts off illumination light generated by the illumination unit 120, be a circuit which cuts off power supply to the illumination unit 120, or be another arrangement.

The sync signal generation unit 850 generates a sync signal (clock signal) and supplies it to the counter 808. Upon receiving the sync signal supplied from the sync signal generation unit 850, the counter 808 performs a counting operation and supplies a count value to the effective pixel row determination unit 802 and black reference pixel row determination unit 804. Based on the count value supplied from the counter 808, the effective pixel row determination unit 802 supplies, to the effective pixel row selection unit 240A, a signal representing a period in which one of a plurality of effective pixel rows should be selected. In response to this, the effective pixel row selection unit 240A sequentially selects the plurality of effective pixel rows. Based on the count value supplied from the counter 808, the black reference pixel row determination unit 804 supplies, to the black reference pixel row selection unit 240B and illumination control unit 806, a signal representing a period in which one of a plurality of black reference pixel rows should be selected. In response to this, the black reference pixel row selection unit 240B sequentially selects the plurality of black reference pixel rows. The illumination control unit 806 gives an instruction to the illumination cutoff unit 840 to cut off illumination light.

Figure 9:
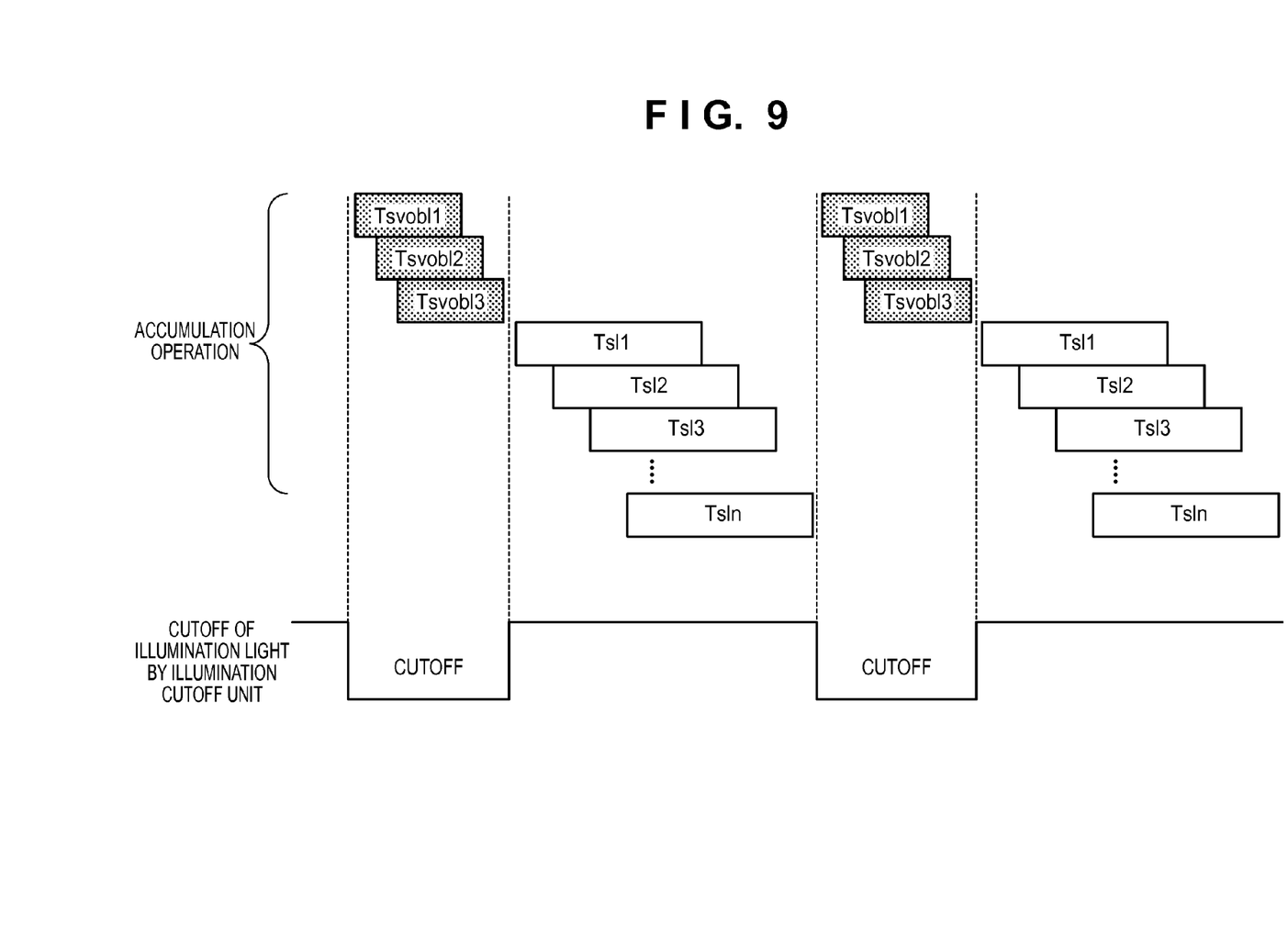
FIG. 9 is a chart showing a control example (driving example) of a vertical black reference pixel, an effective pixel, and an illumination control unit in the image sensing apparatus according to the second embodiment.

FIG. 9 shows a control example (driving example) of a vertical black reference pixel VOBP, an effective pixel EP, and the illumination control unit 806. As in FIG. 2, Tsvob11, Tsvob12, and Tsvob13 indicate accumulation operations on black reference pixel rows OBL1, OBL2, and OBL3. Tsl1, Tsl2, Tsl3, . . . , Tsln indicate accumulation operations on effective pixel rows L1, L2, L3, . . . , Ln. In FIG. 9, a period "cutoff" is a period in which the illumination control unit 806 gives an instruction to the illumination cutoff unit 840 to cut off illumination light. This control prevents entrance of infrared light into the photoelectric converter of the vertical black reference pixel VOBP in the period in which charge accumulation for obtaining a black reference signal in the vertical black reference pixel VOBP is performed. An accurate black reference signal can therefore be obtained.

Figure 10:
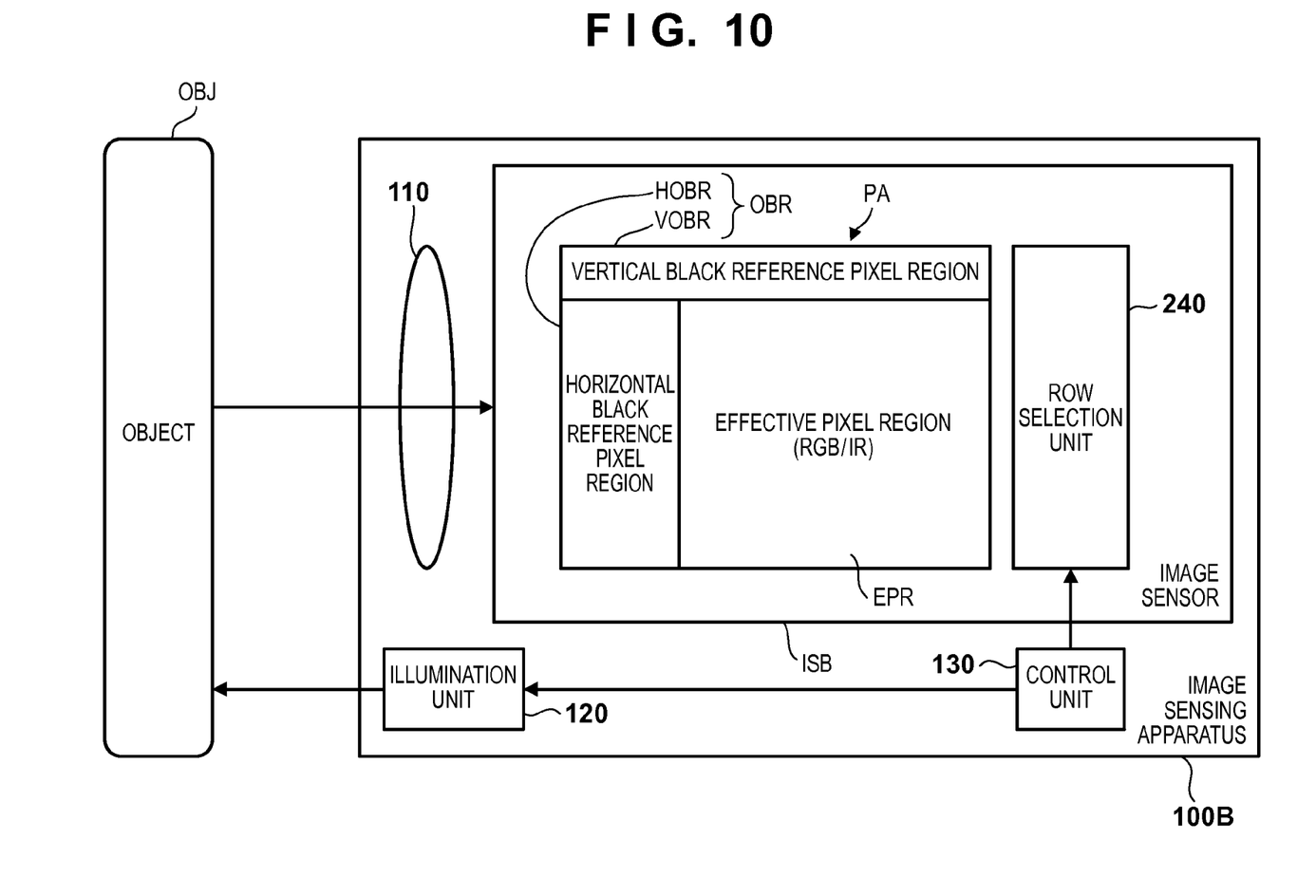
FIG. 10 is a block diagram showing the arrangement of an image sensing apparatus according to the third embodiment.

FIG. 10 is a block diagram showing the arrangement of an image sensing apparatus 100B according to the third embodiment of the present invention. The third embodiment is different from the first embodiment in that an effective pixel region EPR includes pixels for detecting visible light, in addition to pixels for detecting an infrared ray. The remaining part is the same as that in the first embodiment.

Figure 11:
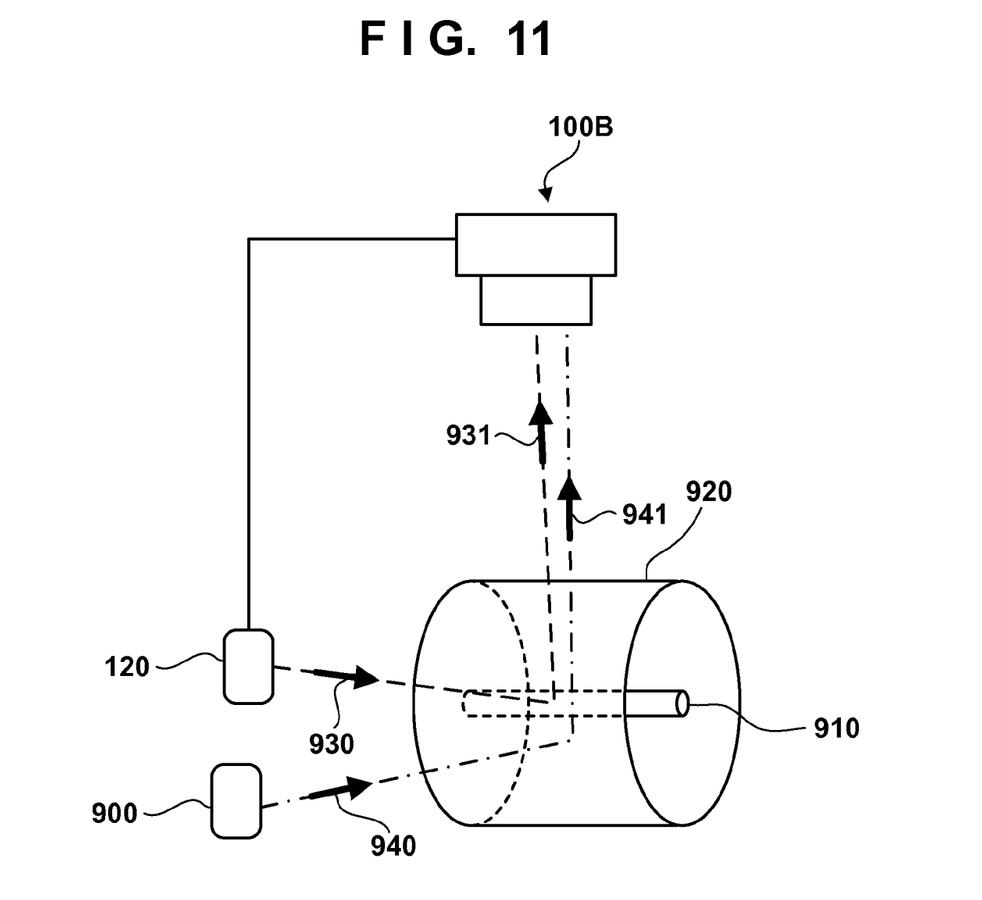
FIG. 11 is a view showing an example of an application of the image sensing apparatus according to the third embodiment to a biopsy.

FIG. 11 shows an example of an application of the image sensing apparatus 100B according to the third embodiment to a biopsy. An object contains a scatterer 920, and a tissue 910 serving as an inspection target arranged in the scatterer 920. The scatterer 920 can be, for example, the arm or body of a subject. The tissue 910 can be, for example, a blood vessel. A fluorescent material is administered to the tissue 910. An illumination unit 120 illuminates the scatterer 920 with illumination light 930 including an infrared ray. The tissue 910 illuminated with the illumination light 930 radiates an infrared ray 931 excited by the illumination light 930. The infrared ray 931 is detected by effective pixels for detecting an infrared ray in the image sensing apparatus 100B. To the contrary, an illumination unit 900 which generates visible light 940 illuminates the scatterer 920 with the visible light 940. Visible light 941 scattered or reflected by the scatterer 920 illuminated with the visible light 940 is detected by effective pixels for detecting visible light in the image sensing apparatus 100B.

Figure 12:
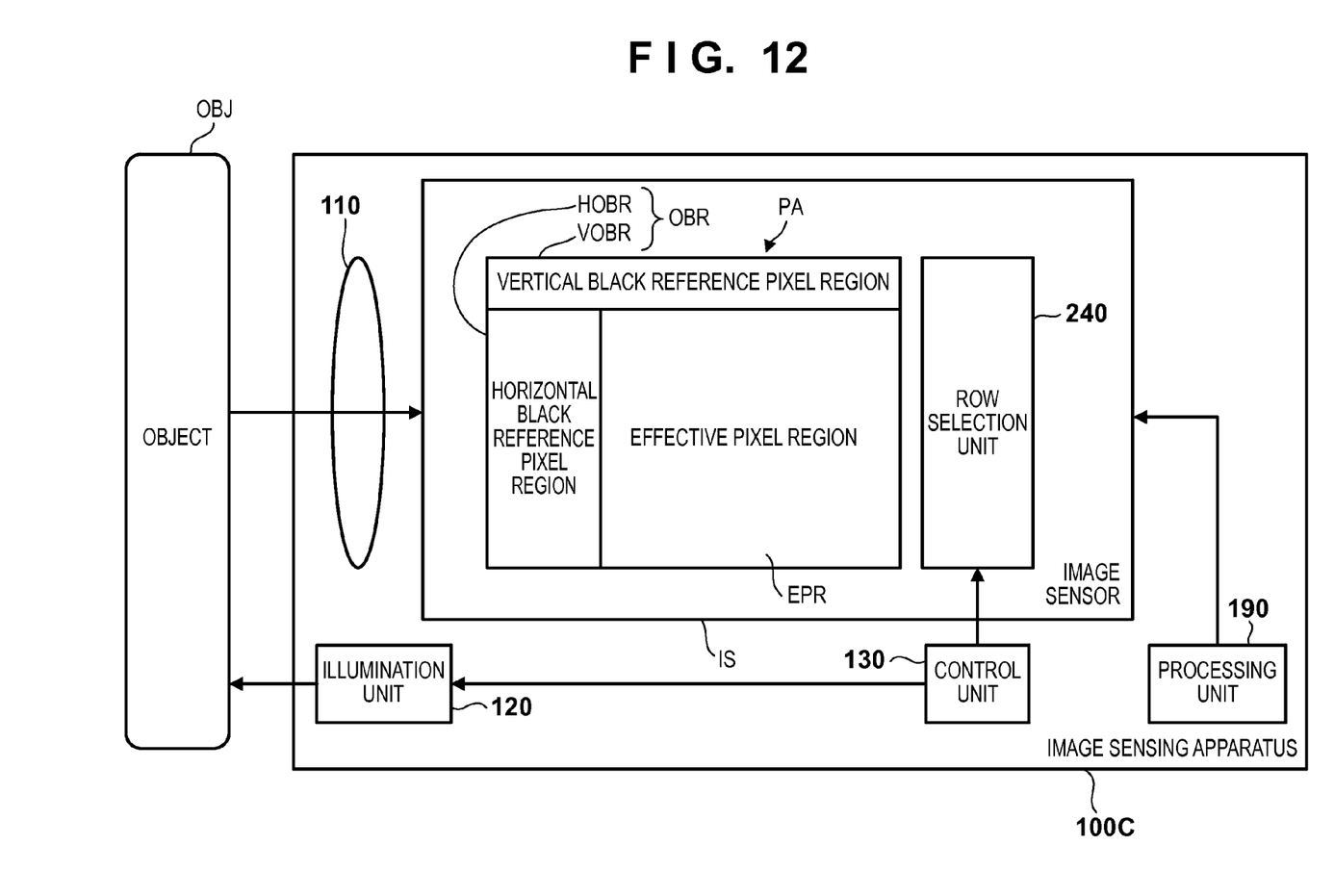
FIG. 12 is a block diagram showing the arrangement of an image sensing apparatus according to the fourth embodiment.

FIG. 12 is a block diagram showing the arrangement of an image sensing apparatus 100C according to the fourth embodiment of the present invention. The image sensing apparatus 100C according to the fourth embodiment is a modification of the image sensing apparatus according to one of the first to third embodiments. In the image sensing apparatus according to one of the first to third embodiments, an infrared ray may enter a horizontal black reference pixel HOBP (second black reference pixel) when detecting an infrared ray by an effective pixel EP, that is, when sensing an infrared image. This is because the horizontal black reference pixel HOBP is a black reference pixel included in an effective pixel row, as exemplified in FIG. 7, and charges are simultaneously accumulated in the effective pixel EP and horizontal black reference pixel HOBP belonging to the same effective pixel row.

Thus, a black reference signal detected by using the vertical black reference pixel VOBP does not contain an error arising from an infrared ray, but a black reference signal detected by using the horizontal black reference pixel HOBP contains an error arising from the infrared ray. The image sensing apparatus 100C therefore includes a processing unit 190. Based on the signal of the vertical black reference pixel VOBP and the signal of the horizontal black reference pixel HOBP (second black reference pixel), the processing unit 190 obtains an error which arises from illumination light and is contained in the signal of the horizontal black reference pixel HOBP (second black reference pixel). For example, the processing unit 190 obtains, as an error, a difference between a processed value (for example, an average value) obtained by processing the signals of a plurality of horizontal black reference pixels HOBP (second black reference pixels), and a processed value (for example, an average value) obtained by processing the signals of a plurality of vertical black reference pixels VOBP. The processing unit 190 corrects the signal of the horizontal black reference pixel HOBP (second black reference pixel) by subtracting the error from the signal of the horizontal black reference pixel HOBP (second black reference pixel). Alternatively, the processing unit 190 may be configured to output the error. The processed value obtained by processing the signals of the plurality of horizontal black reference pixels HOBP (second black reference pixels) can be, for example, a processed value (for example, an average value) obtained by processing the signals of the horizontal black reference pixels HOBP on a plurality of effective pixel rows (preferably, all effective pixel rows). The processed value obtained by processing the signals of a plurality of vertical black reference pixels VOBP can be, for example, a processed value (for example, an average value) obtained by processing the signals of the vertical black reference pixels VOBP on a plurality of black reference pixel rows (preferably, all black reference pixel rows).

Each embodiment in this specification has mainly explained an example in which the black reference pixel VOBP, for which the accumulation period for obtaining a black reference signal is a period in which the illumination unit 120 does not generate illumination light, belongs to a row different from an effective pixel row on which the effective pixels EP are arranged. Each embodiment described in this specification is not limited to this example. That is, the accumulation period of the black reference pixel VOBP suffices to be a period in which the illumination unit 120 does not generate illumination light. Each embodiment in this specification is not limited by the arrangement of the black reference pixel VOBP and effective pixel EP.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-253610, filed Dec. 6, 2013, which is hereby incorporated by reference herein in its entirety.

What is claimed is:

1. An image sensing apparatus comprising:
   a pixel array including (a) an effective pixel region including effective pixels arranged on first and second rows, each of the effective pixels being configured to output an effective signal by receiving an infrared ray returning from an object in a state that the object is illuminated with illumination light from an illuminator, and (b) a black reference pixel region including black reference pixels arranged on third and fourth rows, each of the black reference pixels being configured to output a black reference signal; and
   a controller configured to (a) control the effective pixels, the black reference pixels, and the illuminator, such that (i) charge accumulation in the black reference pixels for obtaining the black reference signal is performed in a state that the object is not illuminated with the illumination light from the illuminator, and (ii) charge accumulation in the effective pixels is performed in a state that the object is illuminated with the illumination light from the illuminator, and (b) control the first, second, third, and fourth rows such that the charge accumulations in the third row, the fourth row, the first row, and the second row start in this order, and a time difference of starting the charge accumulation between the fourth row and the first row is larger than a time difference of starting the charge accumulation between the third row and the fourth row,
   wherein the pixel array does not include a row of pixels whose charge accumulation do not start between the starting the charge accumulation of the fourth row and the starting the charge accumulation of the first row, and
   wherein the apparatus outputs a signal based on the black reference signal of the third row, and a signal based on the black reference signal of the fourth row, individually.

2. The apparatus according to claim 1, wherein the fourth row and the second row are adjacent to each other.

3. The apparatus according to claim 1, wherein the effective pixel region includes a plurality of effective pixel rows including the first and second rows, and
   wherein the illumination of the object by the illuminator starts after a start of charge accumulation on an effective pixel row on which charge accumulation starts finally among the plurality of effective pixel rows, and ends before an end of charge accumulation on an effective pixel row on which charge accumulation ends first among the plurality of effective pixel rows.

4. The apparatus according to claim 1, wherein the black reference pixel region includes a second black reference pixel in which charge accumulation is performed in a period in which the object is illuminated with the illumination light.

5. The apparatus according to claim 4, wherein the second black reference pixel is arranged on the same row as one of the plurality of effective pixel rows.

6. The apparatus according to claim 4, further comprising a processing unit configured to obtain, based on a signal of the black reference pixel and a signal of the second black reference pixel, an error which arises from the illumination light and is contained in the signal of the second black reference pixel.

7. The apparatus according to claim 1, wherein the effective pixel region further includes a pixel configured to detect visible light.

8. The apparatus according to claim 1, wherein the illuminator comprises an illumination unit configured to generate the illumination light, and
wherein the controller is configured to control the illumination unit such that the illumination unit does not generate the illumination light in the charge accumulation period of the third and fourth rows.

9. The apparatus according to claim 1, wherein the illuminator comprises (a) an illumination unit configured to generate the illumination light, and (b) an illumination cutoff unit configured to cut off illumination of the object by the illumination unit, and
wherein the controller is configured to control the illumination cutoff unit such that the illumination cutoff unit cuts off the illumination of the object in the charge accumulation period of the third and fourth rows.

10. A method of driving an image sensing apparatus, the image sensing apparatus comprising a pixel array including (a) an effective pixel region including effective pixels arranged on first and second rows, each of the effective pixels being configured to output an effective signal by receiving an infrared ray returning from an object in a state that the object is illuminated with illumination light from an illuminator, and (b) a black reference pixel region including black reference pixels arranged on third and fourth rows, each of the black reference pixels being configured to output a black reference signal, the method comprising:
controlling the effective pixels, the black reference pixels, and the illuminator such that (i) charge accumulation in the black reference pixels for obtaining the black reference signal is performed in a state that the object is not illuminated with the illumination light from the illuminator, and (ii) charge accumulation in the effective pixels is performed in a state that the object is illuminated with the illumination light from the illuminator;
controlling the first, second, third, and fourth rows such that the charge accumulations in the third row, the fourth row, the first row, and the second row start in this order, and a time difference of starting the charge accumulation between the fourth row and the first row is larger than a time difference of starting the charge accumulation between the third row and the fourth row, wherein the pixel array does not include a row of pixels whose charge accumulation do not start between the starting the charge accumulation of the fourth row and the starting the charge accumulation of the first row; and
outputting a signal based on the black reference signal of the third row, and a signal based on the black reference signal of the fourth row, individually.

11. The method according to claim 10, wherein the fourth row and the second row are adjacent to each other.

12. The apparatus according to claim 1, wherein the controller is further configured to control the black reference pixel such that the charge accumulation in the black reference pixel for obtaining the black reference signal is not performed in the charge accumulation period of the second row.

13. An image sensing apparatus comprising:
a pixel array including (a) an effective pixel region including effective pixels arranged on first and second rows, each of the effective pixels being configured to output an effective signal by receiving an infrared ray returning from an object in a state that the object is illuminated with illumination light from an illuminator, and (b) a black reference pixel region including black reference pixels arranged on third and fourth rows, each of the black reference pixels being configured to output a black reference signal; and
a controller configured to (a) control the effective pixels, the black reference pixels, and the illuminator such that (i) charge accumulation in the black reference pixels for obtaining the black reference signal is performed in a state that the object is not illuminated with the illumination light from the illuminator, and (ii) charge accumulation in the effective pixels is performed in a state that the object is illuminated with the illumination light from the illuminator, and (b) control the first, second, third, and fourth rows such that the charge accumulations in the third row, the fourth row, the first row, and the second row start in this order, and a time difference of starting the charge accumulation between the fourth row and the first row is larger than a time difference of starting the charge accumulation between the first row and the second row,
wherein the pixel array does not include a row of pixels whose charge accumulation do not start between the starting the charge accumulation of the fourth row and the starting the charge accumulation of the first row, and
wherein the apparatus outputs a signal based on the black reference signal of the third row, and a signal based on the black reference signal of the fourth row, individually.

14. The apparatus according to claim 1, wherein the time difference of starting the charge accumulation between the fourth row and the first row is larger than a time difference of starting the charge accumulation between the first row and the second row.

15. The apparatus according to claim 13, wherein the fourth row and the second row are adjacent to each other.

* * * * *